US007620287B2

(12) United States Patent
Appenzeller et al.

(10) Patent No.: US 7,620,287 B2
(45) Date of Patent: Nov. 17, 2009

(54) TELECOMMUNICATIONS HOUSING WITH OPTICAL FIBER MANAGEMENT

(75) Inventors: Mark David Appenzeller, Ft. Worth, TX (US); Monique Lise Cote, Ft. Worth, TX (US); Brent Michael Frazier, Haslet, TX (US); Raymond Glenn Jay, Arlington, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/809,474

(22) Filed: May 31, 2007

(65) Prior Publication Data

US 2008/0298763 A1    Dec. 4, 2008

(51) Int. Cl.
 *G02B 6/00*  (2006.01)
(52) U.S. Cl. ..................................... 385/135; 385/134
(58) Field of Classification Search ................. 385/134, 385/135
See application file for complete search history.

(56) References Cited

U.S. PATENT DOCUMENTS

| 4,900,123 | A | 2/1990 | Barlow et al. ............... 350/96.2 |
| 5,067,784 | A | 11/1991 | Debortoli et al. ............. 385/53 |
| 5,167,001 | A | 11/1992 | Debortoli et al. ............. 385/135 |
| 5,353,367 | A | 10/1994 | Czosnowski et al. ......... 385/135 |
| 5,399,814 | A | 3/1995 | Staber et al. ................. 174/135 |
| 5,511,144 | A | 4/1996 | Hawkins et al. ............. 385/135 |
| 5,778,130 | A | 7/1998 | Walters et al. ............... 385/134 |
| 6,532,332 | B2 * | 3/2003 | Solheid et al. ............... 385/134 |
| 6,944,389 | B2 | 9/2005 | Giraud et al. ............... 385/135 |
| 7,200,316 | B2 | 4/2007 | Giraud et al. ............... 385/135 |
| 7,397,996 | B2 * | 7/2008 | Herzog et al. ............... 385/135 |

OTHER PUBLICATIONS

The Siemon Company, Network Cabling Solutions, 'The ABC's of Fiber Management', Mar. 28, 2000, www.siemon.com.

* cited by examiner

*Primary Examiner*—Jennifer Doan
(74) *Attorney, Agent, or Firm*—John H. Vynalck

(57) ABSTRACT

A telecommunications housing includes a plurality of outer walls defining a housing interior volume and an exit. A plurality of adapters is disposed on an interior panel for connection to connectors of fiber optic cables. At least one radius guide is mounted in the interior volume and has a cable guide portion configured to receive portions of the fiber optic cables and guide the fiber optic cables toward the exit without violating a predetermined minimum fiber optic bend radius. An external guide member may also be located on the outside the housing adjacent the exit. The external guide member has a cable guide portion configured to receive portions of the fiber optic cables and guide the fiber optic cables away from the exit without violating a predetermined minimum fiber optic bend radius.

23 Claims, 5 Drawing Sheets

TELECOMMUNICATIONS HOUSING WITH OPTICAL FIBER MANAGEMENT

BACKGROUND OF THE DISCLOSURE

Various telecommunications housings have been proposed wherein many fiber optic adapters are provided in high density groups. Such housings have included both individual units and units capable of being mounted together in racks. Such housings often include a grid of adapters arranged in rows and columns. Fiber optic connectors attach to the adapters to connect optical fibers to the desired adapters. The optical fibers may be part of short jumper cables or more lengthy output cables. The optical fibers connected to the adapters may be collected to one side or the other of the housing, or split to both sides, to keep the fibers organized so that a craftsman may work on the connections at the housing. However, improved structures and methods for collecting and organizing optical fibers with reference to such a housing would be welcome.

BRIEF SUMMARY OF THE DISCLOSURE

The various embodiments of the present disclosure provide telecommunications housings and related structures that improve the organization and control of optical fibers terminated at the housings.

Further embodiments provide guide members within and/or outside of telecommunications housings for guiding fiber optic cables to prevent violation of minimum bend radius limits.

Still further embodiments provide angled support plates and/or angled adapters for orienting fiber optic cables.

In one particular embodiment, a telecommunications housing includes a plurality of outer walls, the outer walls defining a housing interior volume and an exit therefrom; an interior panel disposed within the housing interior volume; a plurality of adapters disposed on the interior panel for connection to connectors of fiber optic cables; and a radius guide mounted within the housing interior volume, the radius guide having a cable guide portion configured to receive portions of the fiber optic cables spaced from the adapters and further configured to guide the fiber optic cables in a direction of the exit without violating a predetermined minimum fiber optic bend radius.

In this particular embodiment, the outer walls include a first wall, the interior panel being substantially perpendicular to the first wall. Additionally, a support plate may be located within the interior volume. The support plate may be mounted at a non-orthogonal angle relative to the first wall and the interior panel, the radius guide being mounted to the support plate.

Also in this embodiment, the adapters each have a central axis and may be attached to the interior panel so that the central axes extend outward non-orthogonally from the interior panel. For example, the central axes of the adapters may be angled at up to about 30 degrees relative to the interior wall.

Still further in this embodiment, the cable guide portions may have a curved configuration with a radius of curvature not less than the predetermined minimum fiber optic bend radius; e.g., from about ¼ inch to about 1.5 inches.

The foregoing and other embodiments may also have an external guide member located on an outside surface of one of the outer walls adjacent the exit. The external guide member may include a cable guide portion configured to receive second portions of the fiber optic cables and guide the fiber optic cables away from the exit without violating a predetermined minimum fiber optic bend radius.

It should be understood that the various concepts and embodiments disclosed herein may be combined and modified in various ways to achieve new embodiments within the scope of the present disclosure. Therefore, the above aspects of various embodiments should not be considered limiting, and the full disclosure of this specification and the appended claims and their permissible equivalents should be consulted to understand the full scope of the present disclosure.

BRIEF DESCRIPTION OF THE SEVERAL VIEWS OF THE DRAWINGS

Figure 1:
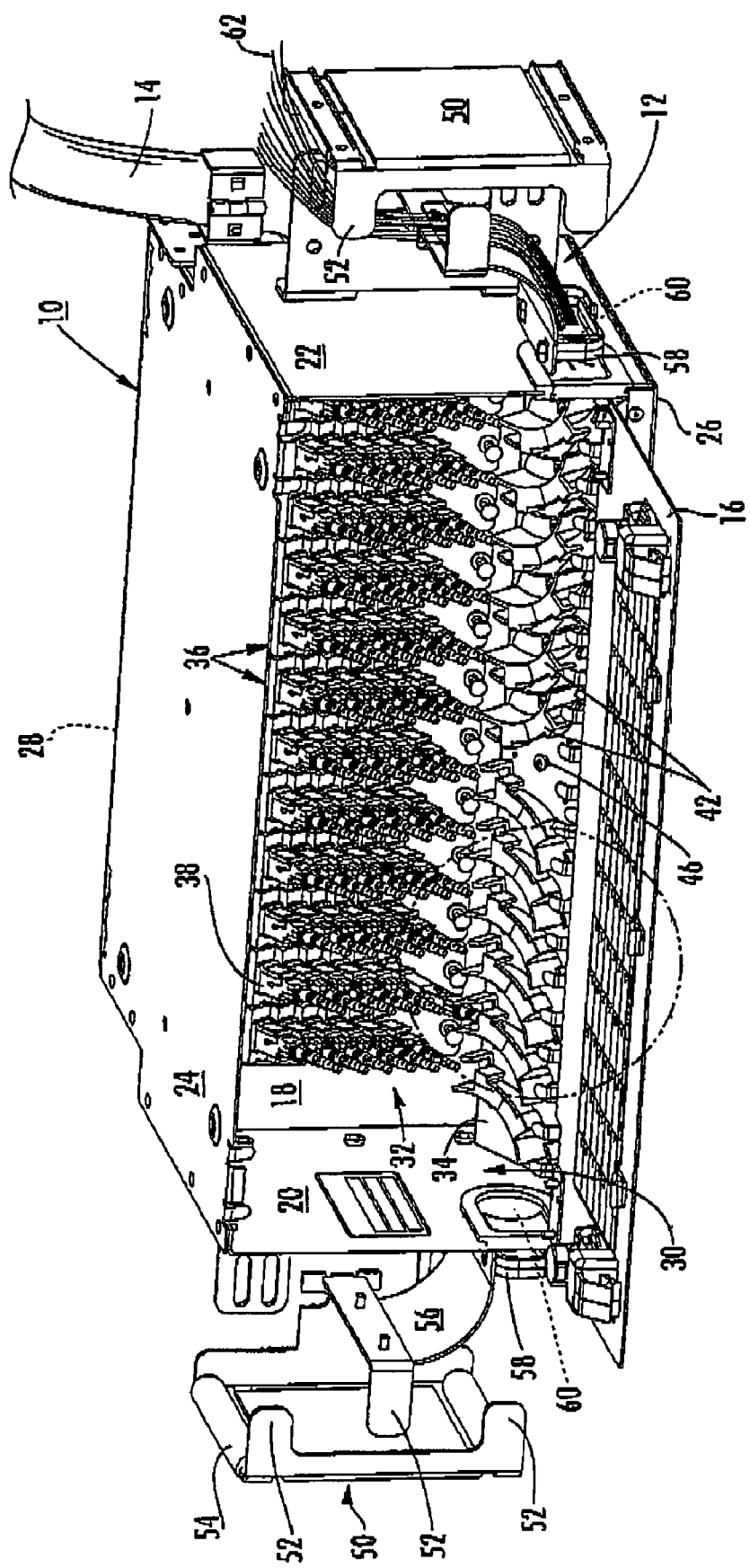
Figure 2:
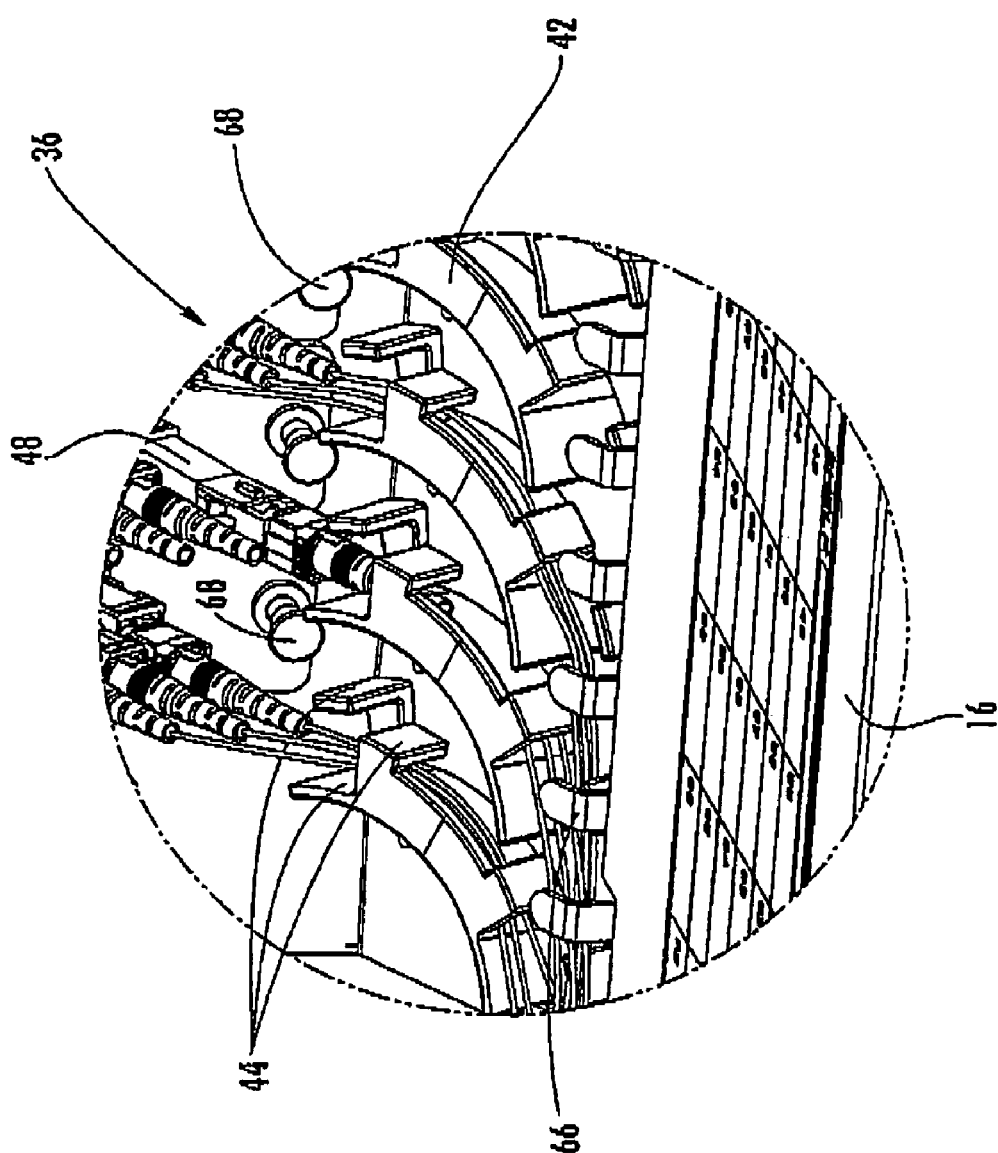
Figure 3:
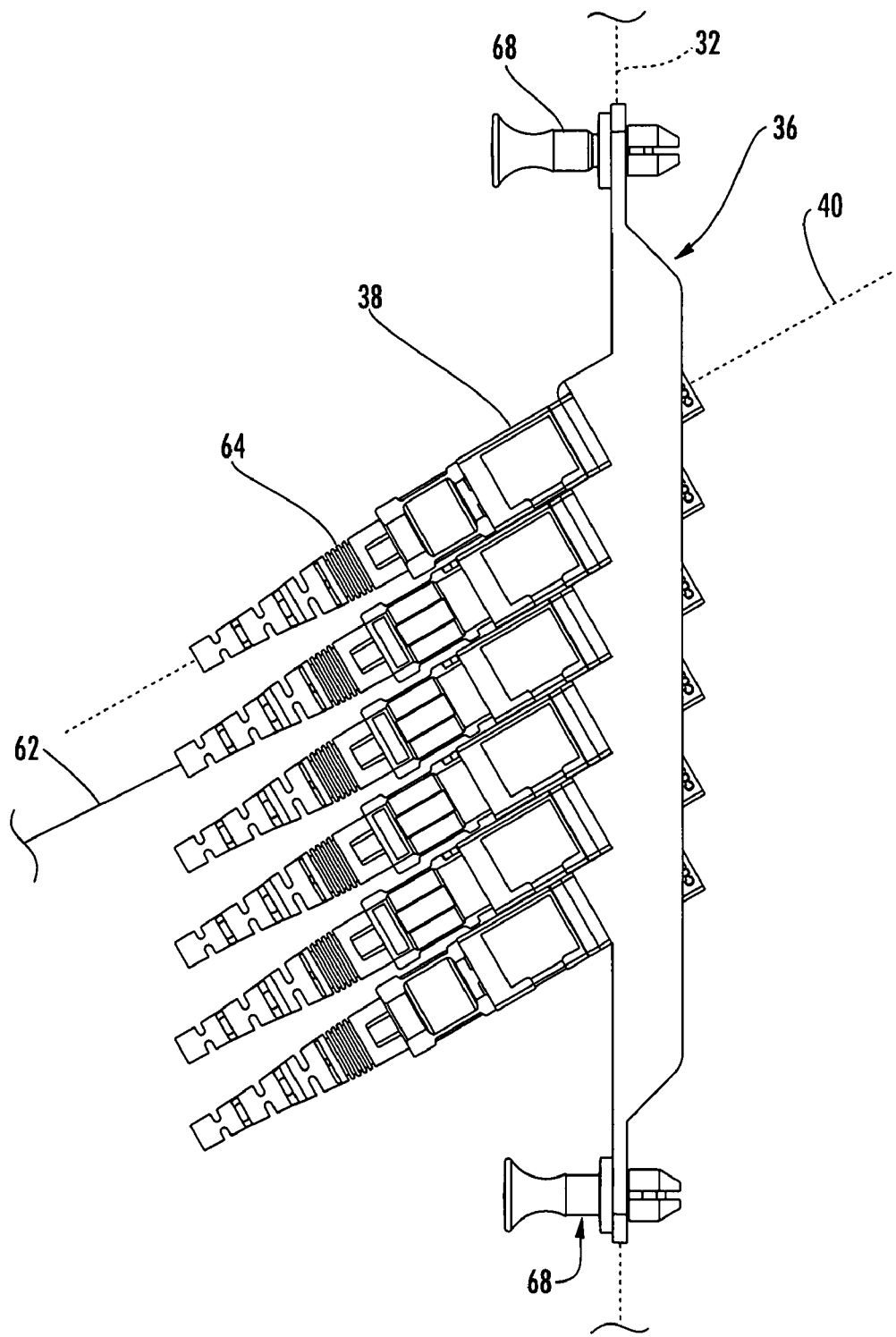
Figure 4:
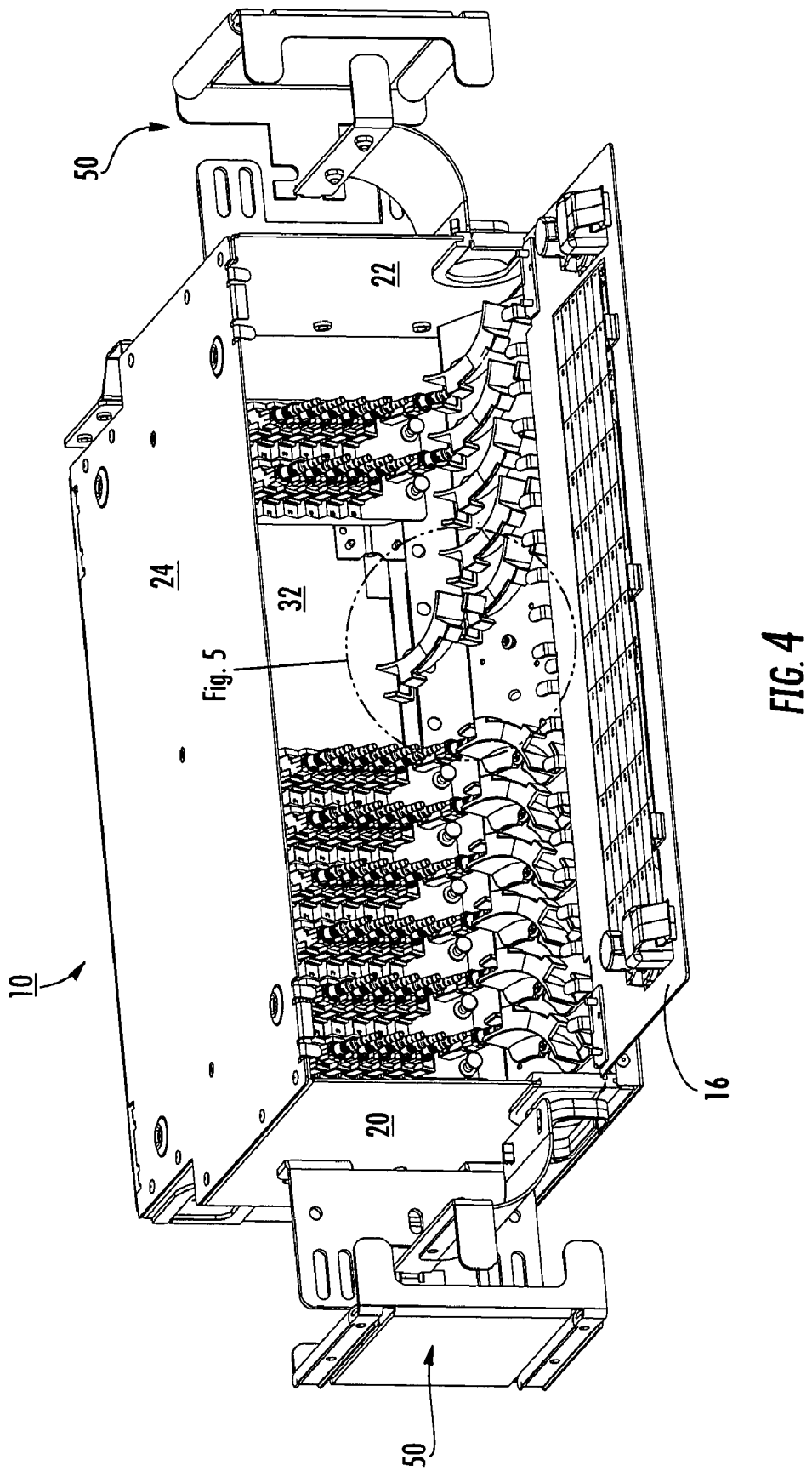
Figure 5:
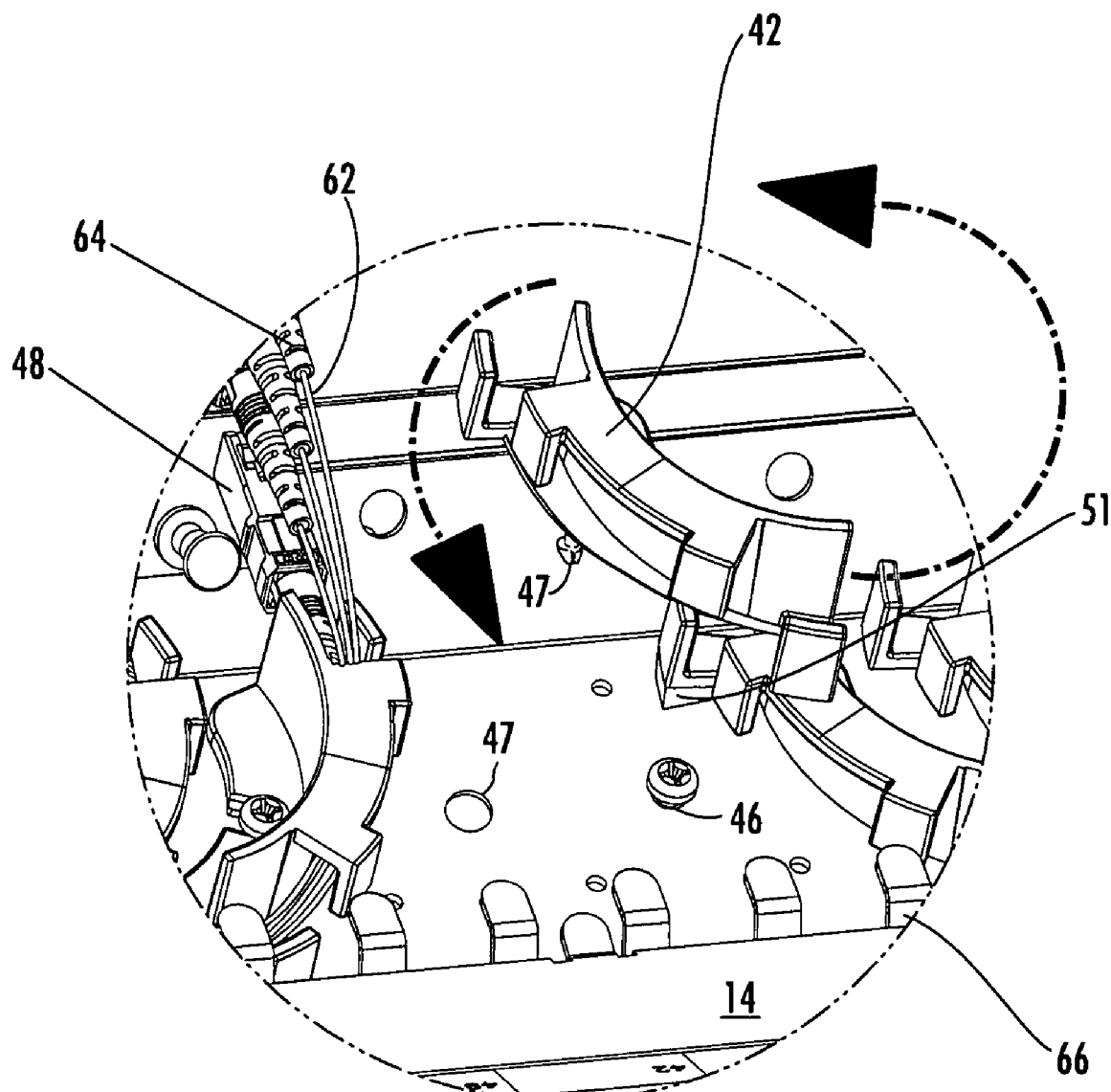

Having thus described various exemplary embodiments in general terms, reference will now be made to the accompanying drawings, which are not necessarily drawn to scale and are meant to be illustrative and not limiting, and wherein:

FIG. 1 is a perspective view of a telecommunications housing according to an embodiment of the disclosure;

FIG. 2 is an enlarged view of a portion of the housing of FIG. 1 showing fiber optic cable radius guide members mounted inside the housing;

FIG. 3 is a side view of an adapter panel as in FIG. 1, particularly showing various components oriented at a non-orthogonal angle;

FIG. 4 is another perspective view of the housing as in FIG. 1, particularly showing manipulation of one of the fiber optic cable radius guide members; and FIG. 5 is an enlarged view of a portion of the housing as in FIG. 4, particularly showing rotation of the fiber optic cable radius guide member.

DETAILED DESCRIPTION OF THE DISCLOSURE

The present disclosure now will be described more fully hereinafter with reference to the accompanying drawings, in which some, but not all possible embodiments are shown. Indeed, the disclosure may be embodied in many different forms and should not be construed as limited to the embodiments set forth herein; rather, these embodiments are provided so that this disclosure will satisfy applicable legal requirements. Although apparatuses for providing telecommunications housings are described and shown in the accompanying drawings with regard to specific types of housings, it is envisioned that the functionality of the various apparatuses and methods may be applied to any now known or hereafter devised housings in which it is desired to provide optical fiber management.

The detailed description uses numerical and letter designations to refer to features of the drawings. Like or similar designations of the drawings and description have been used to refer to like or similar parts of various embodiments according the disclosure.

With reference to FIG. 1, one embodiment of a telecommunications housing according to the present disclosure is designated broadly by reference numeral 10. As shown in this example, the housing 10 is substantially rectangular and manages a plurality of fiber optic cables 12 and outside plant cables 14. In general, the housing 10 may include a door 16, a bulkhead wall or faceplate 18, sidewalls 20, 22, a top 24 and a bottom 26. These components form an enclosure having an interior volume or space 30 for terminating, joining or connecting the fiber optic cables 12 and the plant cables 14 as will be described in greater detail below.

Although the housing 10 in FIG. 1 may accommodate a standard nineteen inch or twenty-three inch rack, the housing 10 can be manufactured in a variety of sizes and shapes to meet various requirements. Thus, it should be understood that the housing 10 may be any type of housing used to terminate, join or connect fiber optic cables. For instance, the housing 10 may include a standalone unit or a rack mount unit capable of combination with multiple housings of the same or different types. Those skilled in the art will appreciate further that the housing 10 may have additional doors or other openings, for instance on opposite sides, to allow for various types of connections to outside plant cables, jumper cables and the like. Likewise, the housing 10 may be equipped to accommodate a fiber count from about 12 to about 72 but can be more or less as required. Accordingly, the embodiment of housing 10 should be considered only one illustrative example of the disclosure, and application of the inventive concepts herein can be made across wide varieties of housings and fiber optic systems.

With further particular reference to the interior 30 shown in FIG. 1, an interior panel 32 is located adjacent or attached to the wall 18 and an angled support plate 34 is located at or above the bottom 26 of the housing 10. As shown, a plurality of adapter panels 36 is connected to the interior panel 32. In this example each of the adapter panels 36 includes six adapters 38, each of which defines a central axis 40 (see FIG. 3). As shown, the adapters 38 may be formed in columns along the interior panel 32 extending from near the wall 20 to proximate the wall 22 and between the top 24 and the bottom 26. Those skilled in the art of telecommunications panels will understand that the adapter panels 36 may have fewer or more than six adapters 38 and likewise, there may be fewer or more than the twelve adapter panels 36 shown in FIG. 1. Further, although the adapter panels 36 are shown arranged in twelve columns in this example, it will be appreciated that other orientations and arrangements, such as diagonal arrangements, may be used to accommodate various requirements, requests, and housing shapes. Also, various and irregular spacings between the adapter panels 36 and the adapters 38 may be utilized.

Referring now to both FIGS. 1 and 2, a plurality of guide members or radius guides 42 are installed in the interior space 30 to guide and route the fiber optic cables 12 in the form of separate jumpers or jumper cables 62 for connection to the interior panel 32 and through either left or right exits or apertures 60 (for figure clarity, only some jumper cables 62 are depicted). As shown, the radius guides 42 may be chamfered to prevent sharp edges from harming the jumpers 62 and may be curved left or right to accommodate the jumpers 62 exiting through their respective apertures 60. More particularly, the radius guides 42 have curved configurations with each having a radius of curvature not less than the predetermined minimum fiber optic bend radius; e.g., about ¼ inch to about 1.5 inches.

As further shown in FIGS. 1 and 2, the radius guides 42 are attached to the angled plate 34, which is mounted at an angle other than 90 degrees, i.e., non-orthogonal, relative to the sidewalls 20, 22 and the interior panel 32. For example, the plate 34 may be angled at about 30 degrees relative to horizontal. Of course, the angled plate 34 may be angled more or less than 30 degrees if required as long as angle variations do not violate the fiber bend radius of the jumpers 62, e.g., of between about ¼ inch to about 1.5 inches.

As further shown in FIGS. 1 and 2, the radius guides 42 each include one or more cable guide portions or fingers 44 that may be curved upward complementary to the angled plate 34. The radius guides 42 may as a whole be angled upward relative to horizontal, for instance, by building up respective sections 51 of the radius guides 42 to achieve an upward angle toward the interior panel 32 (see FIG. 5). In other words, the respective bottom portions 51 of the radius guides 42 may be thicker or taller approaching the interior panel 32 and gradually taper downward in a direction of the door 16. Thus, the radius guides 42 with thicker sections 51 may be used in place of, or in addition to, the angled plate 34. In all cases, it will be readily apparent to the skilled artisan that the angled plate 32 and the radius guides 42 operate to maintain the required bend radii in the jumpers 62 in both parallel and perpendicular directions, whether the jumpers 62 are in an installed position or are under some degree of tensile loading; e.g., when a technician applies tension to the fiber optic cables 12 during servicing.

With further particular reference to FIG. 1, the housing 10 may include an external cable guide 50, alternatively referred to herein as a vertical cable guide, cable guide member or bend radius limiter. The cable guide 50 may include cable guide portions (also, flanges or fingers) 52, a lateral feed curved piece 54, a curved protector sheet 56, and a clip 58. As shown, the cable guide portions 52 guide the jumpers 62 in a direction of the clip 58, which abuts or attaches to the aperture 60 of the housing 10. The cable guide portions 52 safely turn the jumpers 62 through the clip 58 and the aperture 60. Meanwhile, the curved protector sheet 56 protects the jumpers 62, for example, from being snagged by tools or entangled with other jumpers feeding from different directions. Finally, the lateral feed curved piece 54 safely turns the jumpers 62 in a direction away from the housing 10. As shown, the cable guide portions 52, the curved piece 54 and the clip 58 may be snap-on pieces that are molded, for instance, from plastic. Alternatively, these components may be unitarily formed with the external cable guide 50 but are designed in any case with smooth, curved surfaces to prevent snagging, bending or breaking the jumpers 62.

With reference now to both FIGS. 2 and 3, the individual jumpers 62 each have a connector 64. As shown most clearly in FIG. 3, when the connector 64 is connected to one of the adapters 38, the connector 64 (and thus the jumper 62) is aligned with the central axis 40 of the adapter 38. As briefly introduced above, the central axis 40 is angled downward in this example approximately 30 degrees relative to the substantially vertical interior panel 32 (shown in phantom in FIG. 3) to which the adapter panel 36 is attached by toggles or snap-fit devices 68. Thus, the angled orientation of the connector 64 complements the upwardly angled radius guides 42 to maintain a proper bend radius in the jumpers 62.

As shown in FIGS. 2 and 5, an in-line attenuator 48 may be utilized between one of the adapters 38 and one of the connectors 64 without crowding or harming the components, in particular the jumper 62. As shown, there is sufficient room between the radius guide 42 and the adapter panel 32 when employing the attenuator 48. The skilled artisan will understand that various types of adapters and connectors may be used on one or more of the jumpers 62 and may be of any design and may include various hardware elements such as the depicted attenuator 48 or the like.

FIG. 5 most clearly also shows the interchangeability of the left and right oriented radius guides 42. As shown, the radius guides 42 are interchangeable and reversible to permit redirecting the jumpers 62. For instance, a technician servicing the housing 10 may find it necessary to redirect one of the groupings of jumpers 62 to the left or to the right aperture 60 shown in FIGS. 1 and 4. Therefore, as shown by the dashed semi-circle arrows in FIG. 5, the radius guides 42 may be removed by unscrewing a screw 46 or unsnapping a snap-fit arrangement 47. To facilitate twisting and snap-fit motions, the radius guides 42 may be manufactured from a thermoplastic material. However, the radius guides 42 are not limited to any particular material and alternative materials such as metal may be used instead of or in addition to thermoplastic material FIG. 5 further shows a plurality of finger or leaf protectors 66, which are located between the radius guides 42 and the door 16. The leaf protectors 66 are curved inward in this example and prevent the door 16 from closing on and pinching the jumpers 62 once the technician has finished servicing the unit. The leaf protectors 66 may have a suitable spring constant in order for the technician to work the jumpers 62 into place and to yield somewhat to a group of jumpers 62 so as not to pinch them when the door 16 is closed. The group of jumpers 62 may be fewer or greater in number or may be a unitary piece and are not limited to the illustrated example.

Many modifications and other embodiments set forth herein will come to mind to one skilled in the art to which the disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation. For example, possible references herein to "top," "bottom," "upward," "upper," "higher," "lower," "downward," "descending," "ascending," "side," "first," and "second" structures, elements, designations, geometries and the like are intended solely for purposes of providing an enabling disclosure and in no way suggest limitations regarding the operative orientation or order of the exemplary embodiments or any components thereof.

That which is claimed:

1. A telecommunications housing, comprising:
   a plurality of outer walls, the outer walls defining a housing interior volume and an exit therefrom;
   an interior panel disposed within the housing interior volume;
   a plurality of adapters disposed on the interior panel for connection to connectors of fiber optic cables; and
   a radius guide mounted within the housing interior volume, the radius guide having a cable guide portion configured to receive portions of the fiber optic cables spaced from the adapters and further configured to guide the fiber optic cables in a direction of the exit without violating a predetermined minimum fiber optic bend radius;
   wherein central axes of the adapters extend toward the radius guide, and wherein the fiber optic cables are angled toward the radius guide when attached to the adapter.

2. The telecommunications housing as in claim 1, wherein the outer walls include a first wall, the interior panel being substantially perpendicular to the first wall, and further comprising a support plate located within the interior volume, the support plate being mounted at a non-orthogonal angle relative to the first wall and the interior panel, the radius guide being mounted to the support plate.

3. The telecommunications housing as in claim 2, wherein the outer walls include a second wall perpendicular to the first wall, and the exit comprises an opening extending though the second wall.

4. The telecommunications housing as in claim 1, wherein the adapters are formed in a column along the interior panel extending between a first end and a second end, the radius guide being located adjacent the second end of the column.

5. The telecommunications housing as in claim 4, wherein the adapters are attached to the interior panel so that the central axes extend outward non-orthogonally from the interior panel.

6. The telecommunications housing as in claim 1, wherein the central axes of the adapters are angled at up to about 30 degrees relative to the interior wall.

7. The telecommunications housing as in claim 1, wherein the cable guide portions have a curved configuration with a radius of curvature not less than the predetermined minimum fiber optic bend radius.

8. The telecommunications housing as in claim 7, wherein the predetermined minimum fiber optic bend radius is about ¼ inch to about 1.5 inches.

9. The telecommunications housing as in claim 1, wherein the adapters are formed in a plurality of columns along the interior panel, the columns extending between a first end and a second end, and further including a plurality of the radius guides, the radius guides being located adjacent the second end of a respective one of the columns.

10. The telecommunications housing as in claim 9, wherein the outer walls include a second wall perpendicular to the first wall and a third wall perpendicular to the first wall, the second and third walls being disposed at opposite sides of the housing and each including an exit therein, wherein the radius guides are located so as to guide some of the fiber optic cables toward the exit in the second wall and others of the fiber optic cables toward the exit in the third wall.

11. The telecommunications housing as in claim 1, further including an external guide member located on an outside surface of one of the outer walls adjacent the exit, the external guide member having a cable guide portion configured to receive portions of the fiber optic cables and guide the fiber optic cables away from the exit without violating a predetermined minimum fiber optic bend radius.

12. A telecommunications housing comprising:
    a plurality of outer walls, the outer walls defining a housing interior volume, the outer walls including a first wall, a second wall substantially perpendicular to the first wall, and an exit extending through the second wall;
    an interior panel disposed within the housing interior volume;
    a plurality of adapters disposed on the interior panel for connection to connectors of fiber optic cables, the adapters being formed in a plurality of columns along the interior panel, the columns extending between a first end and a second end;
    a support plate mounted within the housing interior volume at an angle to the first and second walls and the interior panel; and
    a plurality of radius guides mounted to the support plate, the radius guides being located adjacent the second end of a respective one of the columns, the radius guides having a cable guide portion configured to receive portions of the fiber optic cables in the respective column and guide the fiber optic cables toward the exit without violating a predetermined minimum fiber optic bend radius.

13. The telecommunications housing as in claim 12, wherein the adapters have a central aids, the adapters being attached to the interior panel so That the central axes extend outward non-orthogonally from the interior panel.

14. The telecommunications housing as in claim 13, wherein the central axes of the adapters extend toward the radius guide, wherein the fiber optic cables are angled toward the radius guide when attached to the adapter.

15. The telecommunications housing as in claim 14, wherein the central axes of the adapters axe angled at up to about 30 degrees relative to the interior wall.

16. The telecommunications housing as in claim 12, wherein the cable guide portions have a curved configuration with a radius of curvature not less than the predetermined minimum fiber optic bend radius.

17. The telecommunications housing as in claim 16, wherein the predetermined minimum fiber optic bend radius is about ¼ inch to about 1.5 inches.

18. The telecommunications housing as in claim 12, wherein the outer walls include a third wall perpendicular to the first wall, the second and third walls being disposed at opposite sides of the housing and including an exit therein, wherein the radius guides are located so as to guide some of the fiber optic cables toward the exit in the second wall and others of the fiber optic cables toward the exit in the third wall.

19. The telecommunications housing as in claim 12, further including an external guide member located on an outside surface of one of the outer walls adjacent the exit, the external guide member having a cable guide portion configured to receive portions of the fiber optic cables and guide the fiber optic cables away from the exit without violating a predetermined minimum fiber optic bend radius.

20. A telecommunications housing, comprising:
a plurality of outer walls, the outer walls defining a housing interior volume and an exit;
an interior panel disposed within the housing interior volume;
a plurality of adapters disposed on the interior panel for connection to connectors of fiber optic cables;
a plurality of radius guides mounted within the housing interior volume, the radius guides having a cable guide portion configured to receive first portions of the fiber optic cables spaced from the adapters and guide The fiber optic cables toward the exit without violating a predetermined minimum fiber optic bend radius; and
an external guide member located on an outside surface of one of the outer walls adjacent the exit, the external guide member having a cable guide portion configured to receive second portions of the fiber optic cables and guide the fiber optic cables away from the exit without violating a predetermined minimum fiber optic bend radius.

21. The telecommunications housing as in claim 20, wherein the adapters have a central axis, the adapters being attached to the interior panel so that the central axes extend outward non-orthogonally from the interior panel toward the respective radius guide, wherein the fiber optic cables are angled toward the radius guides when attached to the adapter.

22. The telecommunications housing as in claim 20, wherein the cable guide portions have a curved configuration with a radius of curvature not less than the predetermined minimum fiber optic bend radius.

23. The telecommunications housing as in claim 20, further comprising a door and a protector, the protector being disposed between the radius guides and the door and being configured to protect the fiber optic cables during door closure.

* * * * *

UNITED STATES PATENT AND TRADEMARK OFFICE
CERTIFICATE OF CORRECTION

| | | Page 1 of 1 |
|---|---|---|
| PATENT NO. | : 7,620,287 B2 | |
| APPLICATION NO. | : 11/809474 | |
| DATED | : November 17, 2009 | |
| INVENTOR(S) | : Mark David Appenzeller et al. | |

It is certified that error appears in the above-identified patent and that said Letters Patent is hereby corrected as shown below:

| Col. | Line | Description |
|---|---|---|
| 6 | 62 | wherein the adapters have a central axis, the adapters being |
| 6 | 63 | attached to the interior panel so that the central axes extend |
| 7 | 4 | wherein the central axes of the adapters are angled at up to |
| 8 | 6 | optic cables spaced from the adapters and guide the |

Signed and Sealed this
Sixth Day of December, 2011

David J. Kappos
*Director of the United States Patent and Trademark Office*